Figure 1:
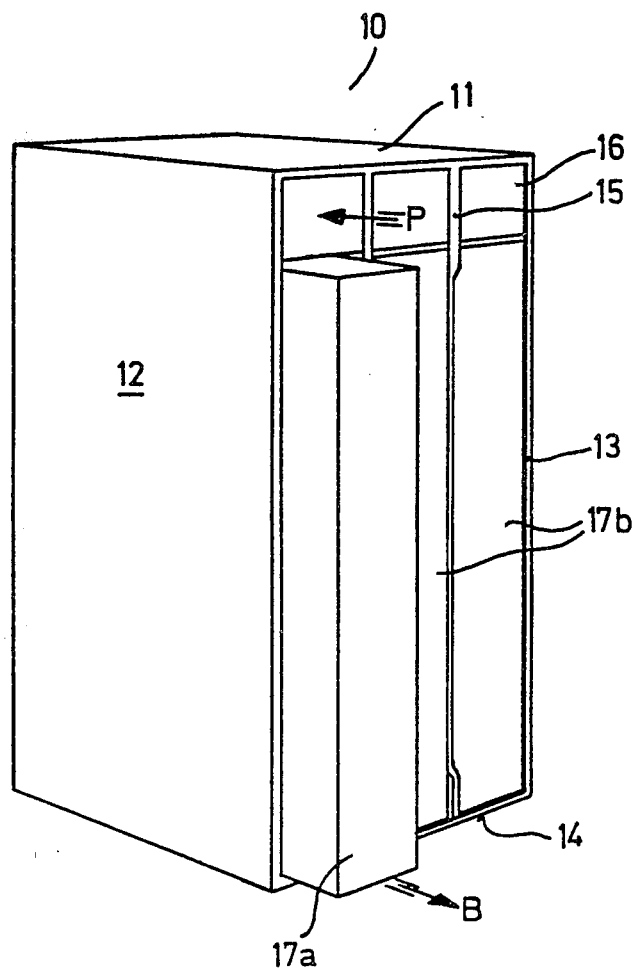

United States Patent [19]

Peinecke

[11] 4,440,299

[45] Apr. 3, 1984

[54] CONTAINER FOR AT LEAST ONE CARRIER MEMBER BEARING A REELED TAPE-LIKE RECORDING MEDIUM, ESPECIALLY A MAGNETIC TAPE CASSETTE, AND AN ASSEMBLY OF TWO OR MORE SUCH CONTAINERS

[75] Inventor: Ludwig Peinecke, Frankenthal, Fed. Rep. of Germany

[73] Assignee: BASF Aktiengesellschaft, Ludwigshafen, Fed. Rep. of Germany

[21] Appl. No.: 379,886

[22] Filed: May 19, 1982

[30] Foreign Application Priority Data

May 25, 1981 [DE] Fed. Rep. of Germany ... 8115534[U]

[51] Int. Cl.³ ..................... A47B 81/06; B65D 85/672
[52] U.S. Cl. .................................. 206/387; 220/23.4; 312/15; 312/111
[58] Field of Search ............... 206/387, 514; 220/23.4, 220/23.6, 23.83, 23.86; 312/15, 18, 19, 111; 360/96.1, 96.5

[56] References Cited

U.S. PATENT DOCUMENTS

| | | | |
|---|---|---|---|
| 3,866,990 | 2/1975 | McRae | 312/15 |
| 3,926,310 | 12/1975 | Ackeret | 206/387 |
| 3,977,523 | 8/1976 | Cousino | 220/23.4 |
| 4,087,138 | 5/1978 | McRae | 206/387 |
| 4,265,369 | 5/1981 | Aboussouan | 206/387 |
| 4,270,817 | 6/1981 | McRae | 312/18 |
| 4,317,603 | 3/1982 | Pepicelli et al. | 206/387 |

FOREIGN PATENT DOCUMENTS

| | | | |
|---|---|---|---|
| 1795584 | 6/1959 | Fed. Rep. of Germany . | |
| 1544144 | 9/1968 | France | 312/111 |
| 2021072 | 11/1979 | United Kingdom | 206/387 |

Primary Examiner—George E. Lowrance
Assistant Examiner—Jimmy G. Foster
Attorney, Agent, or Firm—Keil & Witherspoon

[57] ABSTRACT

A container for at least one carrier member bearing a tape-like recording medium comprises a hollow body and a ramp declining toward an insertion/withdrawal opening, the carrier member with the recording medium being held in the hollow body by holding means and being transferred, after its release, via the ramp to the withdrawal position in which it protrudes at least partially from the opening. The holding means is advantageously a spring-loaded element mounted movably relative to the hollow body and preferably located on a slide.

A plurality of containers can easily be connected to one another by tongue-shaped members which can be inserted into recesses in two abutting side walls, and can easily be detached from one another again.

5 Claims, 5 Drawing Figures

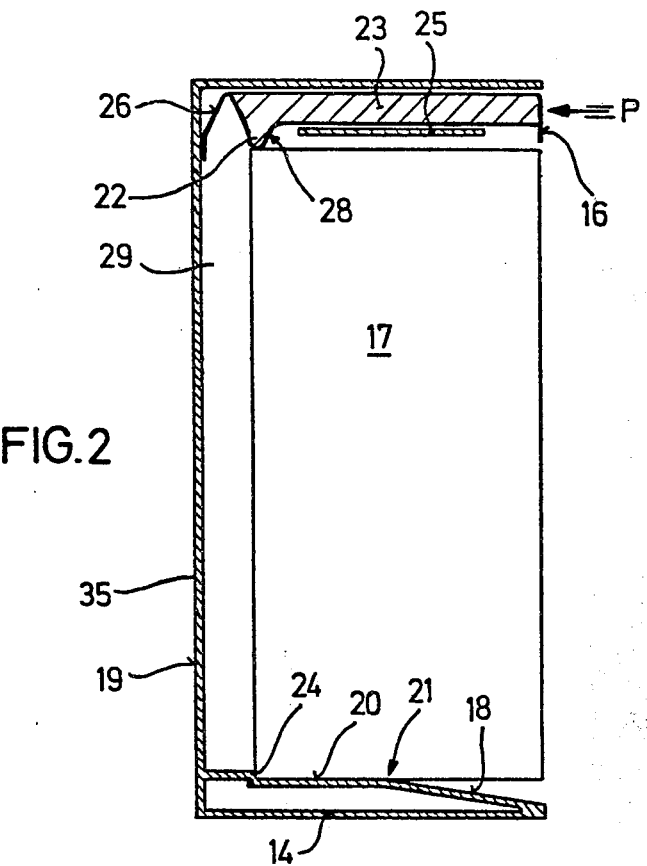
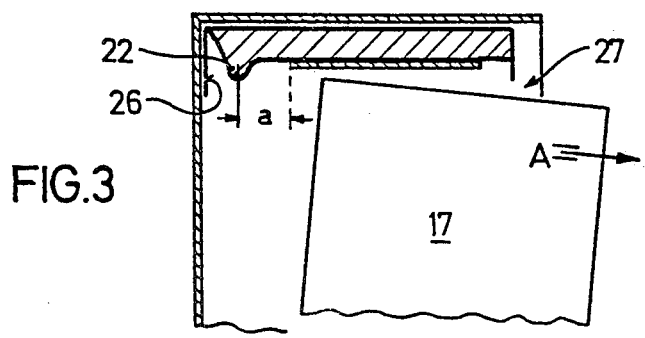

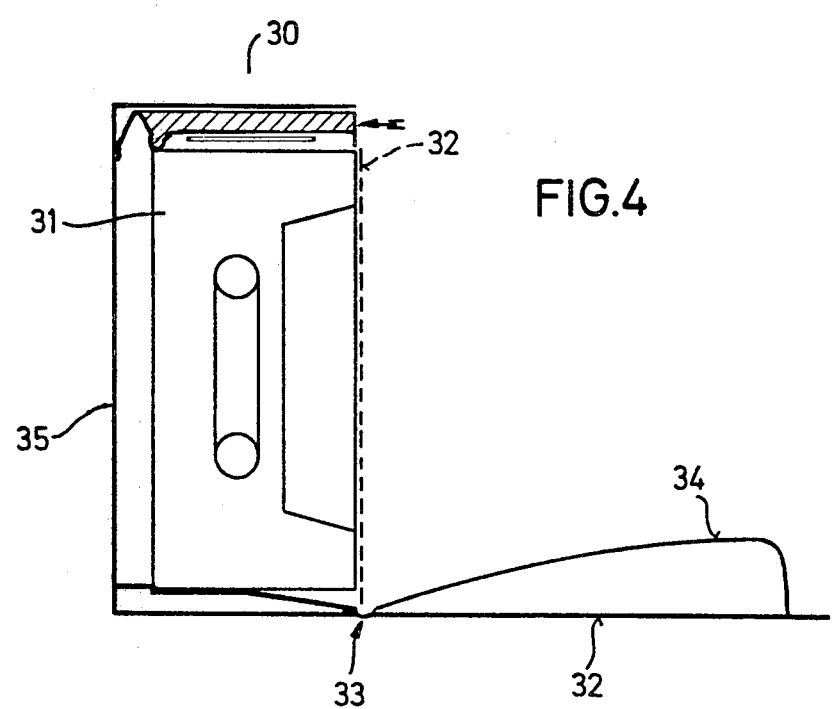

CONTAINER FOR AT LEAST ONE CARRIER MEMBER BEARING A REELED TAPE-LIKE RECORDING MEDIUM, ESPECIALLY A MAGNETIC TAPE CASSETTE, AND AN ASSEMBLY OF TWO OR MORE SUCH CONTAINERS

The present invention relates to a container for accommodating at least one carrier member bearing a reeled tape-like recording medium, especially a magnetic tape cassette, which container consists of a hollow body of essentially right parallelepipedic shape, comprising two large side walls which are parallel to one another, three narrow walls which interconnect the said side walls, and an open side with an insertion/withdrawal opening for the carrier member with the reeled tape; and of a ramp declining toward said insertion/withdrawal opening, and being arranged above the bottom narrow wall; and of holding means which holds the carrier member, bearing the tape-like recording medium, in the container.

The invention further relates to an assembly of two or more containers of this type.

For the purposes of the present invention, the term "carrier member" means any spool, any hub or any cassette bearing a recording medium in tape form, such as photographic film or magnetic tape.

German Utility Model No. 1,795,584 discloses a container for reels of film or magnetic tape, in which an inclined base cooperates with the lid in such a way that, when the lid is opened, the spool rolls forward up to a stop on the lid, from where it can conveniently be taken out. This container is only suitable for tape-like recording media wound on circular spools.

It is an object of the present invention to provide a container of the type described above, from which even substantially rectangular polyhedral tape carriers can easily be removed. It is a further object to provide a container which permits the compact and tight storage of at least one carrier member bearing a reeled recording medium.

We have found that these objects are achieved, in the case of a container of the type described at the outset, if the holding means is designed to be releasable and is provided on the hollow body itself and if, when the holding means is released, the carrier member is transferred to the withdrawal position in which it protrudes from the insertion/withdrawal opening in the hollow body.

This design makes it possible to utilize the intrinsic weight of the carrier member bearing the reeled tape to facilitate extraction thereof, and thus offers the advantage of rapid access to the tape carrier.

In an advantageous embodiment of the container according to the invention, the ramp extends over a portion, preferably over about half, of the length of the bottom narrow wall. This makes it simple to bring about a labile position even in the case of essentially right parallelepipedic tape cassettes. In a further practical embodiment of the container, the holding means for the carrier member is in the form of a spring-loaded element which is mounted movably relative to the hollow body; this simplifies the manufacture of the container.

In an advantageous embodiment, the holding element is provided on a slide located inside the hollow body. According to the invention, the slide is located inside the hollow body above the carrier member. This arrangement ensures simple and trouble-free actuation of the slide and hence of the holding element, and prevents mutual interference between the carrier member and the slide.

In a further embodiment, the container can be provided with a closure portion, thereby making it possible to accommodate magnetic tape cassettes and spools in the container without additional storage boxes such as the snap pack for compact cassettes or film reels. This design has the advantage that, even after the closure portion has been opened, the time at which the cassette or reel is taken out can be chosen at will, and that, in the case of a reel, it cannot roll out toward the user if the closure portion is opened inadvertently.

The invention further relates to an assembly of two or more containers of the type described above, wherein the containers rest against one another with their large side walls, in a plane of contact, without an interspace, and have cut-outs in the side walls extending inwardly from the front edges of the said walls, the peripheral surfaces of each cut-out being inclined toward the plane of contact, so that the edges of two adjacent cut-outs, when viewed in cross-section, have a tapering shape, and wherein a removable connecting element is provided which corresponds in size and shape to the size and shape of the cut-outs, and has a groove which cooperates with the tapering portion formed by the two inclined surfaces and thus connects the side walls to one another.

In this way, a row of juxtaposed containers of any desired length can be formed. These containers can of course also be stacked one above another, and connected to one another in the same manner.

The cut-outs can also taper inwardly toward the middle of the side walls, and the respective sizes and shapes of the cut-outs and of the connecting element can be so chosen that, when the connecting element is inserted, a frictional force has to be overcome, thereby preventing the connecting element from subsequently slipping out unintentionally.

Figure 5:
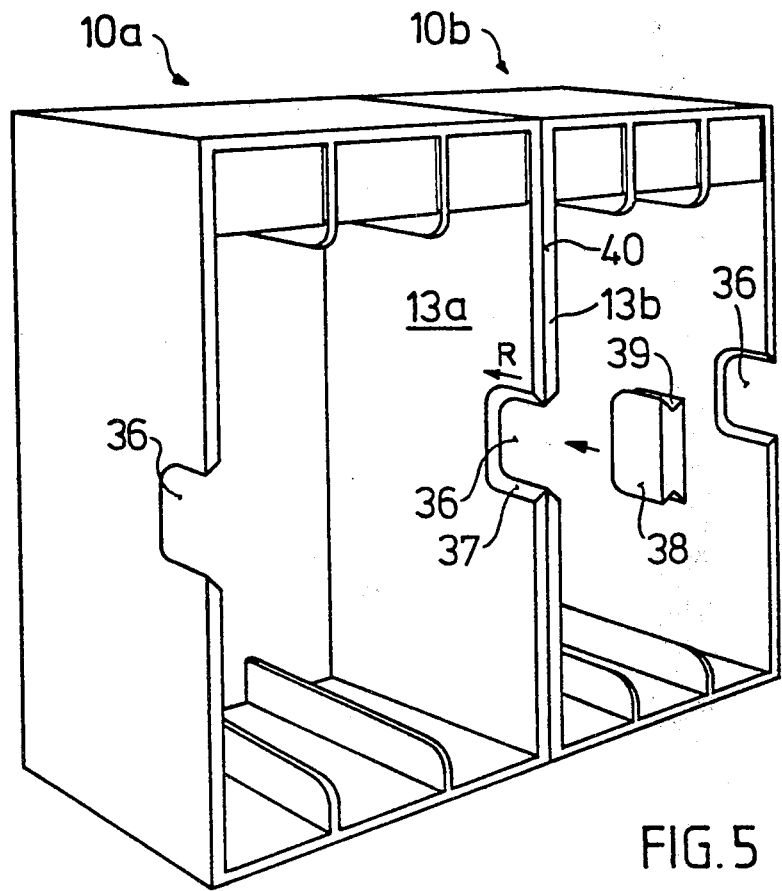

Further details of the invention are disclosed in the following description of the embodiments given by way of example and illustrated in the accompanying drawings, in which FIG. 1 shows in perspective view a novel container for three essentially right parallelepipedic cassette snap packs, FIG. 2 shows the container of FIG. 1 in vertical section and with a cassette snap pack inserted therein, FIG. 3 shows a portion of the container of FIG. 2, during removal of the cassette snap pack, FIG. 4 shows in vertical section a further embodiment of a novel container having a closure member, with a cassette inserted therein, and FIG. 5 shows in perspective view an assembly of two interconnected containers similar to the one shown in FIG. 1.

FIG. 1 shows the container 10 according to the invention for three cassettes, with upper wall 11, outer side walls 12 and 13 and lower wall 14, and with two partitions 15 which divide the container into three compartments. Each of the compartments is a hollow rectangular body open on one long narrow side. In each of these compartments, an actuating button 16 is provided below the upper wall 11. Below this is the insertion/withdrawal opening 27 (cf. FIG. 3) for the box 17a, 17b; for brevity's sake this insertion/withdrawal opening is referred to hereinafter as "opening".

FIG. 2 shows a section through a compartment 35 with a box 17. Slightly above the bottom narrow wall 14 is provided a ramp 18, which may also extend as far as the rear wall 19. In the present embodiment, the ramp 18 is short and merges into a horizontal support member 20 for the box 17. The length of the horizontal support member 20 is so chosen that the center of gravity of the box 17 plus contents lies in front of the edge 21, i.e. above the ramp 18, as a result of which a labile box position is produced.

The invention thus makes use of gravity to bring the box 17 into the withdrawal position, i.e. to tilt the box onto the ramp 18. However, the box is held in a stable manner, at its rear upper corner, by means of a holding member which in the present case is in the form of a cam-shaped projection 22. So that the projection 22 can be disengaged from the box 17, it is located at the end of a slide 23, which has an actuating button 16 at the other end. The slide 23 rests on a web 25 in the compartment and is connected via a leaf spring 26 to the rear wall 19, so that the projection 22 is always resiliently urged into its retaining position. When the actuating button 16 is pressed in the direction of the arrow P, the slide 23 is displaced and the projection 22 is moved backwards beyond the rear edge of the box 17, thereby releasing the latter.

The slide 23 should be of a shape appropriate to its function and can in particular consist of a thermoplastic, as can the entire container. The slide 23 can be of square or rectangular cross section, and may be made of solid material or from a profile. The spring 26 can be molded integral with, or suitably fastened to, the end of the slide. The other end of the leaf spring 26 can be fastened to the rear wall 19 by, for example, thermal welding or ultrasonic welding. FIG. 3 shows the box 17 immediately after displacement of the slide 23 in the direction of the arrow P. The box 17 is released at the top and tilts forward onto the ramp 18, as a result of which the upper part of the box 17 moves, in the direction of the arrow A, outward through the opening 27, as does the lower part of the box 17, as shown by arrow B in FIG. 1. Thereafter, the slide 23 is returned to its retaining position, shown in FIG. 2, by means of the spring 26. When the box 17 is pushed back again into the compartment, the upper surface of the box slides under the projection 22 which is provided with a forward-facing inclined surface 28.

So that the spring 26 and slide 23 can travel a sufficient distance a, a narrow space 29 is provided behind the box 17. A stop 24 on the support member 20 accordingly restricts the depth to which the box 17 can be pushed into the compartment 35.

FIG. 4 shows a cross-section of a container 30 having a closure member 32, which can, like container 10, be a storage container for a plurality of tape carrier members. The broken lines show the closure member 32 in the closed position. A suitable hinge means is a film hinge 33, also because it is simple to manufacture by injection molding. Side members 34 on the closure member 32 serve to align the compartment 35 and closure member 32 during closing and furthermore provide better protection against dust.

This design of container 30 is particularly useful for cassettes 31 and reels (not shown) without additional packaging, and is also very suitable for the shipment or mailing of tape-like recording media.

The container according to the invention can be designed to store just one or a plurality of tape carrier members, and has very advantageous handling characteristics. Short webs, as shown in FIG. 5, can be used instead the partitions 15 of FIG. 1 to produce separate storage locations.

FIG. 5 shows two containers 10a and 10b arranged adjacent to one another, with cut-outs 36 in the side walls. The edges 37 are bevelled so that in the plane of contact 40 of the side walls 13a and 13b which rest against one another, the two edges taper to a point. The connecting element 38 is tongue-shaped and provided with a groove 39 extending round three sides; after inserting the element 38 into the cut-out 36 and pressing it home, the groove cooperates with the edges 37, as a result of which the receptacles are detachably connected to one another. The respective shapes and sizes of the elements 38 and cut-out 36 must be suitably matched. It is advantageous for the cut-out 36 to taper in the direction of the arrow R, so that the frictional force produced when the element 38 is pressed home prevents the element from slipping out subsequently.

The novel containers can also be connected together in the same or a similar manner to form a stack.

Basically, therefore, a separate connecting element and a cut-out are utilized, and the connecting element, after introduction into the cut-outs of two adjacent containers, snugly engages, if desired also frictionally, the tapering edges 37 and thus connects the containers together, thereby creating, for example, an infinitely extensible system for the storage of substantially rectangular polyhedral articles, especially of tape cassettes.

We claim:

1. A container for accommodating at least one carrier member bearing a reeled tape-like recording medium, especially a magnetic tape cassette, which container consists of a hollow body of essentially right parallelepipedic shape, said hollow body comprising:
    two large side walls which are parallel to one another, three narrow walls which interconnect said side walls, and an open side with an insertion/withdrawal opening for the carrier member with the reeled tape;
    a support surface which is substantially parallel to the bottom narrow wall and is considerably shorter than the length of the bottom wall of the carrier member,
    a ramp declining along an edge from said support surface to said insertion/withdrawal opening;
    a holding means on the hollow body, said holding means, while said carrier member is resting with its bottom wall on said support surface, normally engaging said carrier member at its top so as to keep said member from tilting forwardly along said edge; and
    means for releasing said holding means from said carrier member so as to permit said member to tilt forwardly, under the effect of gravity, about said edge into a withdrawal position on said inclined ramp, in which position the carrier member protrudes from the insertion/withdrawal opening.

2. A container as claimed in claim 1, wherein the holding means for the carrier member is a spring loaded element which is movably mounted relatively to the hollow body.

3. A container as claimed in claim 2, wherein said spring loaded element is in the form of a slide located inside the hollow body, said slide having a projection engaging the rear top of said carrier member.

4. A container as claimed in claim 1, wherein the ramp extends over about half of the length of the bottom narrow wall.

5. A container as claimed in claim 1, wherein a closure portion for closing the insertion/withdrawal opening is integrally molded with and hingedly connected to the hollow body.

* * * * *